(12) United States Patent
Ruan et al.

(10) Patent No.: US 9,588,399 B2
(45) Date of Patent: Mar. 7, 2017

(54) ALL-FIBER LASER FREQUENCY MIXER AND FREQUENCY-MIXING FIBER LASER THEREOF

(71) Applicant: SHENZHEN UNIVERSITY, Shenzhen, Guangdong (CN)

(72) Inventors: Shuangchen Ruan, Guangdong (CN); Chunyu Guo, Guangdong (CN); Chenlin Du, Guangdong (CN); Deqin Ouyang, Guangdong (CN); Huaiqin Lin, Guangdong (CN); Weiqi Liu, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 15/058,194

(22) Filed: Mar. 2, 2016

(65) Prior Publication Data
US 2016/0178985 A1    Jun. 23, 2016

Related U.S. Application Data

(63) Continuation of application No. PCT/CN2015/078717, filed on May 12, 2015.

(51) Int. Cl.
| | |
|---|---|
| *G02B 6/24* | (2006.01) |
| *G02B 6/26* | (2006.01) |
| *G02B 6/293* | (2006.01) |
| *G02F 1/365* | (2006.01) |
| *G02F 1/09* | (2006.01) |

(Continued)

(52) U.S. Cl.
CPC ............ *G02F 1/365* (2013.01); *G02B 6/241* (2013.01); *G02B 6/262* (2013.01); *G02B 6/2938* (2013.01); *G02F 1/093* (2013.01); *G02F 1/353* (2013.01); *G02F 1/3551* (2013.01); *H01S 3/0092* (2013.01); *H01S 3/2383* (2013.01);

(Continued)

(58) Field of Classification Search
CPC .... H01S 3/0092; H01S 3/2383; H01S 3/0064; H01S 3/067; H01S 3/2391; H01S 3/005; G02F 1/365; G02F 1/3551; G02F 1/353; G02F 1/093; G02F 1/383; G02B 6/2938; G02B 6/241; G02B 6/262
See application file for complete search history.

(56) References Cited

U.S. PATENT DOCUMENTS

| | | | | | |
|---|---|---|---|---|---|
| 5,173,799 | A | * | 12/1992 | Tanuma | ............ G02F 1/37 359/326 |
| 5,355,246 | A | * | 10/1994 | Tanuma | ............ G02F 1/37 359/326 |
| 9,366,872 | B2 | * | 6/2016 | Honea | ............ G02B 27/0927 |

* cited by examiner

*Primary Examiner* — John M Bedtelyon

(57) ABSTRACT

The present invention relates to the field of laser frequency-mixing technologies, and in particular, to an all-fiber laser frequency mixer and a frequency-mixing fiber laser thereof. In the all-fiber laser frequency mixer and the frequency-mixing fiber laser thereof, a graded index fiber coupling technology is used to implement an all-fiber laser frequency mixer, and the all-fiber laser frequency mixer is further combined with a fiber laser to implement an all-fiber frequency-mixing fiber laser. The apparatus can implement all-fiber frequency doubling, sum frequency or difference frequency on any one or two of the following linearly polarized narrow linewidth fiber lasers: a 1 µm fiber laser, a 1.5 µm fiber laser, a 1.9 µm thulium-doped fiber laser, a 2 µm thulium holmium co-doped fiber laser, a Raman fiber laser, and a frequency-mixing fiber laser and implement an all-fiber fiber laser covering ultraviolet, visible, near-infrared, mid-infrared bands.

11 Claims, 1 Drawing Sheet

(51) Int. Cl.
　　　*G02F 1/35*　　　(2006.01)
　　　*G02F 1/355*　　(2006.01)
　　　*H01S 3/00*　　　(2006.01)
　　　*H01S 3/23*　　　(2006.01)
　　　*H01S 3/067*　　(2006.01)
(52) U.S. Cl.
　　　CPC ............. *H01S 3/005* (2013.01); *H01S 3/0064* (2013.01); *H01S 3/067* (2013.01); *H01S 3/2391* (2013.01)

ALL-FIBER LASER FREQUENCY MIXER AND FREQUENCY-MIXING FIBER LASER THEREOF

CROSS REFERENCE TO RELATED APPLICATIONS

The present application is a Continuation application of PCT application No. PCT/CN2015/078717 filed on May 12, 2015, which claims the benefit of Chinese Patent Application No. 201410204641.9 filed on May 14, 2014. All the above are hereby incorporated by reference.

TECHNICAL FIELD

The present invention relates to the field of laser frequency-mixing technologies, and in particular, to an all-fiber laser frequency mixer and a frequency-mixing fiber laser thereof.

BACKGROUND

Laser frequency-mixing technologies such as laser frequency doubling, sum frequency, and difference frequency are important means to implement many new wavelength lasers. By using the frequency doubling or sum frequency, a mid-infrared laser can be converted into a near-infrared laser, a near-infrared laser can be converted into visible light, or visible light can be converted into an ultraviolet laser; by using the laser difference frequency, a near-infrared laser can be into a mid-infrared laser, so that a coverage range of a laser spectral line is extended. The visible light and ultraviolet laser are widely applied to fields such as laser processing, laser medical treatment, laser display, and laser engraving. The mid-infrared laser is widely applied to fields such as atmospheric sounding, laser medical treatment, and infrared countermeasures. Therefore, the laser frequency-mixing technology plays an important role in generation of lasers of all bands.

A current mainstream laser frequency-mixing technology is implemented by using crystal frequency mixing in which nonlinear frequency doubling, sum frequency, or difference frequency is used to perform space coupling on a diode-pumped solid state laser, resulting in a complex structure of the whole system, and a large quantity of space collimation coupling commissioning needs to be performed, and mechanical stability is poor. Consequently, to ensure stable operation of the system, irregular commissioning and maintenance are required. To solve heat problems and improve stability of the solid-state laser pumping-based frequency doubling laser, sum frequency laser or difference frequency laser, laser frequency-mixing has already been performed by using a fiber laser as fundamental frequency light, which can obtain a frequency-mixing laser output characterized by high conversion efficiency, high beam quality, and simple structure. Nevertheless, the system instability problem caused by the space lens coupling between a fiber laser and a frequency doubling crystal, a sum frequency crystal or a difference frequency crystal still hinders further applications of the fiber laser frequency-mixing technology, making it difficult to obtain an all-fiber frequency-mixing laser similar to the fiber laser.

SUMMARY

The technical issue to be solved by the present invention is to provide an all-fiber laser frequency mixer and a frequency-mixing fiber laser thereof. A graded index fiber (Grin fiber) coupling technology is used to implement an all-fiber laser frequency mixer, and the all-fiber laser frequency mixer is further combined with a fiber laser to implement an all-fiber frequency-mixing fiber laser. The present invention is implemented as follows:

An all-fiber laser frequency mixer includes the following parts coupled in sequence:

a laser frequency mixer input fiber, configured to input fundamental frequency light used for frequency-mixing;

a first coreless silica fiber, configured to perform beam expanding transmission on the fundamental frequency light that is input by the laser frequency mixer input fiber;

a first Grin fiber, configured to perform collimation and focusing on the fundamental frequency light that is input after the beam expanding transmission by the first coreless silica fiber;

a second coreless silica fiber, configured to perform focusing transmission on the fundamental frequency light after the collimation and focusing by the first Grin fiber;

a frequency-mixing crystal, configured to perform nonlinear frequency conversion on the fundamental frequency light that is input after the focusing transmission by the second coreless silica fiber, and generate a frequency-mixing laser;

a third coreless silica fiber, configured to perform beam expanding transmission on the frequency-mixing laser generated by the frequency-mixing crystal;

a second Grin fiber, configured to perform collimation and focusing on the frequency-mixing laser that is input after the beam expanding transmission by the third coreless silica fiber;

a fourth coreless silica fiber, configured to perform focusing transmission on the frequency-mixing laser after the collimation and focusing by the second Grin fiber;

a laser frequency mixer output fiber, configured to transmit the frequency-mixing laser that is input after the focusing transmission by the fourth coreless silica fiber; and a fiber end cap, configured to prevent system damage caused by end face reflection.

Further, the fundamental frequency light is a linearly polarized narrow linewidth laser.

Further, the laser frequency mixer input fiber is a polarization-maintaining fiber.

Further, the laser frequency mixer output fiber is a polarization-maintaining fiber whose cutoff wavelength is smaller than a wavelength of the frequency-mixing laser.

Further, a phase-matching wavelength of the frequency-mixing crystal is consistent with a wavelength of the fundamental frequency light.

A frequency-mixing fiber laser includes any one of the foregoing all-fiber laser frequency mixers and further includes a first fiber laser and a first polarization dependent fiber isolator, where:

the first fiber laser is configured to provide fundamental frequency light used for frequency-mixing;

an input end of the first polarization dependent fiber isolator is coupled with an output end of the first fiber laser; and an output end of the first polarization dependent fiber isolator is coupled with the laser frequency mixer input fiber.

Further, the frequency-mixing fiber laser further includes a second fiber laser, a second polarization dependent fiber isolator, and a wavelength division multiplexer, where:

the second fiber laser is configured to provide fundamental frequency light used for frequency-mixing;

an input end of the second polarization dependent fiber isolator is coupled with an output end of the second fiber laser; and the output end of the first polarization dependent fiber isolator and an output end of the second polarization dependent fiber isolator are coupled with the laser frequency mixer input fiber by using the wavelength division multiplexer.

Further, a phase-matching wavelength of the frequency-mixing crystal is consistent with operating wavelengths of the first fiber laser and the second fiber laser.

Further, fibers of the input end and the output end of the first polarization dependent fiber isolator are polarization-maintaining fibers of which parameters are the same as a fiber parameter of the output end of the first fiber laser; fibers of the input end and the output end of the second polarization dependent fiber isolator are polarization-maintaining fibers of which parameters are the same as a fiber parameter of the output end of the second fiber laser.

Further, the first fiber laser and the second fiber laser are linearly polarized narrow linewidth fiber lasers.

Further, a fiber of an input end of the frequency-mixing crystal and a fiber of an output end of the wavelength division multiplexer are polarization-maintaining fibers with same parameters.

Compared with the prior art, the present invention can provide an all-fiber laser frequency mixer. By combing the all-fiber laser frequency mixer with a linearly polarized narrow linewidth fiber laser having high peak power or high mean power, an all-fiber frequency-mixing fiber laser can be implemented. The apparatus can implement all-fiber frequency doubling, sum frequency or difference frequency on any one or two of the following linearly polarized narrow linewidth fiber lasers: a 976 nm Yb-doped fiber laser, a 1 μm Yb-doped fiber laser, a 1.5 μm co-doped erbium-doped fiber laser, a 1.9 μm thulium-doped fiber laser, a 2 μm thulium holmium co-doped fiber laser, a 2.8 μm Er ZBLAN doped fiber laser, a Raman fiber laser, and a frequency doubling laser, a sum frequency laser or a difference frequency laser, and implement an all-fiber fiber laser covering ultraviolet, visible, near-infrared, mid-infrared bands.

DESCRIPTION OF EMBODIMENTS

To make the objectives, technical solutions, and advantages of the present invention more comprehensible, the following further describes the present invention in detail with reference to the accompanying drawings and embodiments. It is understandable that the specific embodiments described herein are only used to explain the present invention and are not intended to limit the present invention.

Figure 1:
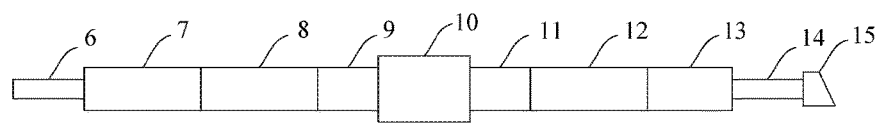
FIG. 1 is a schematic structural diagram of an all-fiber laser frequency mixer according to an embodiment of the present invention.

FIG. 1 is a schematic structural diagram of an all-fiber laser frequency mixer according to an embodiment of the present invention. As shown in FIG. 1, the all-fiber laser frequency mixer includes the following parts coupled in sequence: a laser frequency mixer input fiber 6, a first coreless silica fiber 7, a first Grin fiber 8, a second coreless silica fiber 9, a frequency-mixing crystal 10, a third coreless silica fiber 11, a second Grin fiber 12, a fourth coreless silica fiber 13, a laser frequency mixer output fiber 14, and a fiber end cap 15.

In the foregoing structure, the laser frequency mixer input fiber 6 is a polarization-maintaining fiber and is configured to input fundamental frequency light used for frequency-mixing. The fundamental frequency light is a linearly polarized narrow linewidth laser. A combination of the first coreless silica fiber 7, the first Grin fiber 8, and the second coreless silica fiber 9 is equivalent to a spatial focusing lens and a free space before and after the spatial focusing lens, which collimates and focuses the fundamental frequency light to the center of the frequency-mixing crystal 10 by using an auto-focusing principle. Specifically, the first coreless silica fiber 7 is configured to perform beam expanding transmission on the fundamental frequency light that is input by the laser frequency mixer input fiber. The beam expanding transmission herein is as follows: The first coreless silica fiber 7 is equivalent to a free space before the spatial focusing lens; the fundamental frequency light input by the laser frequency mixer input fiber 6 enters the first coreless silica fiber 7 and is transmitted in the first coreless silica fiber 7; during the transmission, the fundamental frequency light is diffused gradually, so that a beam expanding effect is achieved. The length of the first coreless silica fiber 7 may be calculated according to actual needs. After the beam expanding transmission by the first coreless silica fiber 7, the fundamental frequency light enters the first Grin fiber 8. When the fundamental frequency light enters the first Grin fiber 8, its spot diameter becomes larger. The first Grin fiber 8 is configured to perform collimation and focusing on the fundamental frequency light that is input after the beam expanding transmission by the first coreless silica fiber 7. The second coreless silica fiber 9 is configured to perform focusing transmission on the fundamental frequency light after the collimation and focusing by the first Grin fiber 8, so that after the fundamental frequency light enters the frequency-mixing crystal 10, the fundamental frequency light is focused as a smallest waist spot at the center of the frequency-mixing crystal 10. The focusing transmission herein is as follows: The second coreless silica fiber 9 is equivalent to a free space after the spatial focusing lens; after the collimation and focusing by the first Grin fiber 8, the fundamental frequency light enters the second coreless silica fiber 9 and is transmitted in the second coreless silica fiber 9; during the transmission, the fundamental frequency light converges gradually, so that a focusing effect is achieved. The length of the second coreless silica fiber 9 may be calculated according to actual needs. The frequency-mixing crystal 10 is a phase-matching or quasi-phase-matching frequency-mixing (frequency doubling, sum frequency or difference frequency) crystal, of which a phase-matching wavelength is consistent with a wavelength of the fundamental frequency light. The frequency-mixing crystal 10 is configured to perform nonlinear frequency conversion on the fundamental frequency light that is input after the focusing transmission by the second coreless silica fiber 9, and generate a frequency-mixing laser, where the generated frequency-mixing laser is a frequency-mixing laser whose frequency is $2\omega 1$ (frequency doubling) or $\omega 1+\omega 1$ (sum frequency) or $\omega 1-\omega 1$ (difference frequency) and $\omega 1$ is a frequency of the fundamental frequency light. The generated frequency-mixing laser enters the third coreless silica fiber 11 from the frequency-mixing crystal 10. As mentioned before, a combination of the third coreless silica fiber 11, the second Grin fiber 12, and the fourth coreless silica fiber 13 is also equivalent to a spatial focusing lens and a free space before and after the spatial focusing lens, which collimates and focuses the fundamental frequency light to the core of the laser frequency mixer output fiber 14 by using an auto-focusing principle. Specifically, the third coreless silica fiber 11 is configured to perform beam expanding transmission on the frequency-mixing laser generated by the frequency-mixing crystal 10, so that when the frequency-mixing laser enters the second Grin fiber 12, the spot diameter of the frequency-mixing laser becomes larger; the second Grin fiber 12 is configured to perform collimation and focusing on the frequency-mixing laser that is input after the beam expanding transmission by the third coreless silica fiber 11; the fourth coreless silica fiber 13 is configured to perform focusing transmission on the frequency-mixing laser after the collimation and focusing by the second Grin fiber 12. The laser frequency mixer output fiber 14 is a polarization-maintaining fiber of which a cutoff wavelength is smaller than a wavelength of the frequency-mixing laser and which is transmitted at the wavelength of the frequency-mixing laser in a low loss manner. The laser frequency mixer output fiber 14 is configured to transmit the frequency-mixing laser that is input after the focusing transmission by the fourth coreless silica fiber 13. The fiber end cap 15 is configured to prevent the laser from being reflected back by an end face of the laser frequency mixer output fiber 14, which can prevent system damage.

In the foregoing structure, a rod-type Grin fiber having a long pitch may be selected preferably according to the wavelength of the fundamental frequency light, parameters of the laser frequency mixer input fiber 6 and the laser frequency mixer output fiber 14, and parameters such as the length and reflectivity of the frequency-mixing crystal 10; further, lengths of the first coreless silica fiber 7, the first Grin fiber 8, the second coreless silica fiber 9, the third coreless silica fiber 11, the second Grin fiber 12, and the fourth coreless silica fiber 13 that have optimal coupling efficiency are calculated in an analog manner. The first coreless silica fiber 7, the second coreless silica fiber 9, the third coreless silica fiber 11, and the fourth coreless silica fiber 13 are preferably a rod-type coreless silica fiber. Then, the foregoing fibers are spliced by using a special fiber splicer according to the foregoing coupling relationship. During splicing, the length of each fiber is cut off according to the calculated optimal length. In addition, angles are adjusted to ensure that the polarization direction of the polarization-maintaining fiber matches a direction corresponding to the frequency-mixing crystal.

Figure 2:
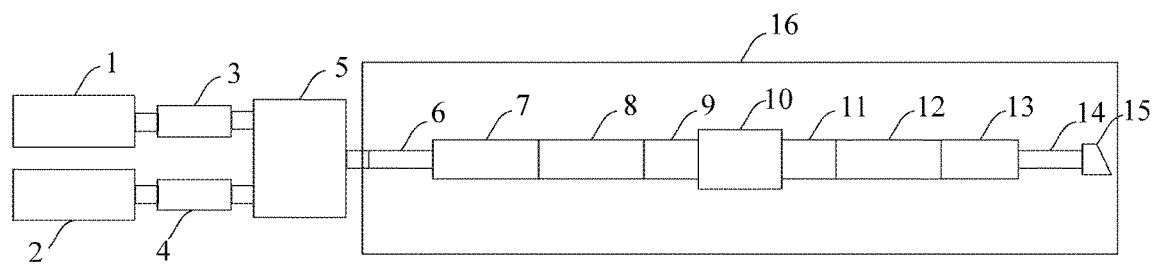
FIG. 2 is a schematic structural diagram of a frequency-mixing fiber laser based on the foregoing all-fiber laser frequency mixer according to an embodiment of the present invention.
Figure 3:
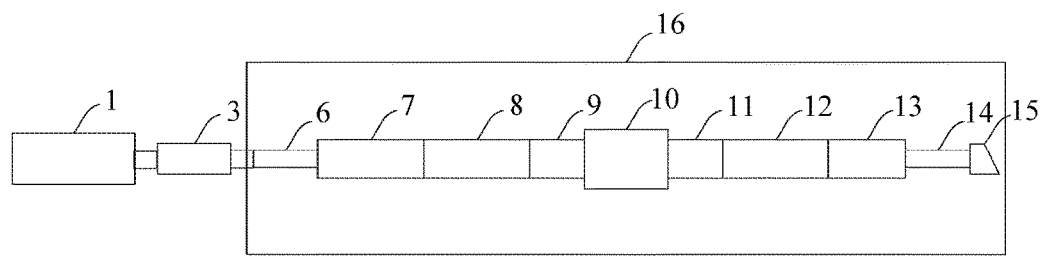
FIG. 3 is a schematic structural diagram of another frequency-mixing fiber laser based on the foregoing all-fiber laser frequency mixer according to an embodiment of the present invention.

All the foregoing structures form the all-fiber laser frequency mixer 16 provided by the embodiment of the present invention. As shown in FIG. 2 and FIG. 3, on the basis of the all-fiber laser frequency mixer 16, an embodiment of the present invention further provides a frequency-mixing fiber laser. As shown in FIG. 2, besides the foregoing all-fiber laser frequency mixer 15, the frequency-mixing fiber laser further includes a first fiber laser 1 and a second fiber laser 2 that are configured to provide fundamental frequency light used for frequency-mixing. An input end of a first polarization dependent fiber isolator 3 is coupled with an output end of the first fiber laser. An input end of a second polarization dependent fiber isolator 4 is coupled with an output end of the second fiber laser 2. Two input ends of a wavelength division multiplexer 5 are coupled with output ends of the first polarization dependent fiber isolator 3 and the second polarization dependent fiber isolator 4 respectively. An output end of the wavelength division multiplexer 5 is coupled with a laser frequency mixer input fiber 6.

In the foregoing structures, fibers of the input end and the output end of the first polarization dependent fiber isolator 3 are polarization-maintaining fibers of which parameters are the same as a fiber parameter of the output end of the first fiber laser 1; fibers of the input end and the output end of the second polarization dependent fiber isolator 4 are polarization-maintaining fibers of which parameters are the same as a fiber parameter of the output end of the second fiber laser 2. The first polarization dependent fiber isolator 3 and the second polarization dependent fiber isolator 4 are configured to prevent their respective next-stage reflected light from damaging the first fiber laser 1 and the second fiber laser 2. The first fiber laser 1 and the second fiber laser 2 are linearly polarized narrow linewidth fiber lasers, which output a high power linearly polarized narrow linewidth laser as the fundamental frequency light used for frequency-mixing. Fibers of the input end and the output end of the wavelength division multiplexer 5 are polarization-maintaining fibers. A frequency-mixing crystal 10 is a phase-matching or quasi-phase-matching frequency-mixing (frequency doubling, sum frequency or difference frequency) crystal whose frequency is consistent with frequencies of the first fiber laser 1 and the second fiber laser 2. A fiber of an output end of the frequency-mixing crystal 10 is also a polarization-maintaining fiber whose parameter is the same as a fiber parameter of the output end of the wavelength division multiplexer 5.

It should be noted that in a case of laser frequency doubling, only one type of corresponding fiber laser needs to be used before the all-fiber laser frequency mixer 16, and the wavelength division multiplexer 5 does not need to be used. The fiber laser is directly coupled with the laser frequency mixer input fiber 6 (shown in FIG. 3) by using the first polarization dependent fiber isolator 3 and the second polarization dependent fiber isolator 4 only. In a case of laser sum frequency or difference frequency, two types of corresponding fiber lasers need to be used before the all-fiber laser frequency mixer 16, and are connected to the two input ends of the wavelength division multiplexer 5 by using the first polarization dependent fiber isolator 3 and the second polarization dependent fiber isolator 4. The two fiber lasers mix two types of fundamental frequency light and input the mixed fundamental frequency light to the laser frequency mixer input fiber 6 (as shown in FIG. 2) by using fibers of the two output ends of the wavelength division multiplexer 5.

The foregoing descriptions are merely exemplary embodiments of the present invention, but are not intended to limit the present invention. Any modifications, equivalent replacements, or improvements made within the spirit and principle of the present invention shall fall within the protection scope of the present invention.

The invention claimed is:

1. An all-fiber laser frequency mixer, comprising the following parts coupled in sequence:
 a laser frequency mixer input fiber, configured to input fundamental frequency light used for frequency-mixing;
 a first coreless silica fiber, configured to perform beam expanding transmission on the fundamental frequency light that is input by the laser frequency mixer input fiber;
 a first graded index (GRIN) fiber, configured to perform collimation and focusing on the fundamental frequency light that is input after the beam expanding transmission by the first coreless silica fiber;

a second coreless silica fiber, configured to perform focusing transmission on the fundamental frequency light after the collimation and focusing by the first Grin fiber;

a frequency-mixing crystal, configured to perform nonlinear frequency conversion on the fundamental frequency light that is input after the focusing transmission by the second coreless silica fiber, and generate a frequency-mixing laser;

a third coreless silica fiber, configured to perform beam expanding transmission on the frequency-mixing laser generated by the frequency-mixing crystal;

a second Grin fiber, configured to perform collimation and focusing on the frequency-mixing laser that is input after the beam expanding transmission by the third coreless silica fiber;

a fourth coreless silica fiber, configured to perform focusing transmission on the frequency-mixing laser after the collimation and focusing by the second Grin fiber;

a laser frequency mixer output fiber, configured to transmit the frequency-mixing laser that is input after the focusing transmission by the fourth coreless silica fiber; and a fiber end cap, configured to prevent system damage caused by end face reflection.

2. The all-fiber laser frequency mixer according to claim 1, wherein the fundamental frequency light is a linearly polarized narrow linewidth laser.

3. The all-fiber laser frequency mixer according to claim 1, wherein the laser frequency mixer input fiber is a polarization-maintaining fiber.

4. The all-fiber laser frequency mixer according to claim 1, wherein the laser frequency mixer output fiber is a polarization-maintaining fiber whose cutoff wavelength is smaller than a wavelength of the frequency-mixing laser.

5. The all-fiber laser frequency mixer according to claim 1, wherein a phase-matching wavelength of the frequency-mixing crystal is consistent with a wavelength of the fundamental frequency light.

6. A frequency-mixing fiber laser, comprising the all-fiber laser frequency mixer according to claim 1 and further comprising a first fiber laser and a first polarization dependent fiber isolator, wherein:

the first fiber laser is configured to provide fundamental frequency light used for frequency-mixing;

an input end of the first polarization dependent fiber isolator is coupled with an output end of the first fiber laser; and an output end of the first polarization dependent fiber isolator is coupled with the laser frequency mixer input fiber.

7. The frequency-mixing fiber laser according to claim 6, further comprising a second fiber laser, a second polarization dependent fiber isolator, and a wavelength division multiplexer, wherein:

the second fiber laser is configured to provide fundamental frequency light used for frequency-mixing;

an input end of the second polarization dependent fiber isolator is coupled with an output end of the second fiber laser; and the output end of the first polarization dependent fiber isolator and an output end of the second polarization dependent fiber isolator are coupled with the laser frequency mixer input fiber by using the wavelength division multiplexer.

8. The frequency-mixing fiber laser according to claim 6, wherein a phase-matching wavelength of the frequency-mixing crystal is consistent with operating wavelengths of the first fiber laser and the second fiber laser.

9. The frequency-mixing fiber laser according to claim 6, wherein fibers of the input end and the output end of the first polarization dependent fiber isolator are polarization-maintaining fibers of which parameters are the same as a fiber parameter of the output end of the first fiber laser; fibers of the input end and the output end of the second polarization dependent fiber isolator are polarization-maintaining fibers of which parameters are the same as a fiber parameter of the output end of the second fiber laser.

10. The frequency-mixing fiber laser according to claim 6, wherein the first fiber laser and the second fiber laser are linearly polarized narrow linewidth fiber lasers.

11. The frequency-mixing fiber laser according to claim 6, wherein a fiber of an input end of the frequency-mixing crystal and a fiber of an output end of the wavelength division multiplexer are polarization-maintaining fibers with same parameters.

* * * * *